Dec. 23, 1924. 1,520,084

M. L. RISHEILL ET AL

WATER HEATER

Filed April 22, 1921  3 Sheets-Sheet 1

Inventors
M.L. Risheill,
S. Ames.
By
Lacey & Lacey, Attorneys

Dec. 23, 1924.

M. L. RISHEILL ET AL 1,520,084

WATER HEATER

Filed April 22, 1921  3 Sheets-Sheet 2

Inventors
M. L. Risheill,
S. Ames.

By Lacy & Lacy, Attorneys

Dec. 23, 1924.
M. L. RISHEILL ET AL
WATER HEATER
Filed April 22, 1921
1,520,084
3 Sheets-Sheet 3
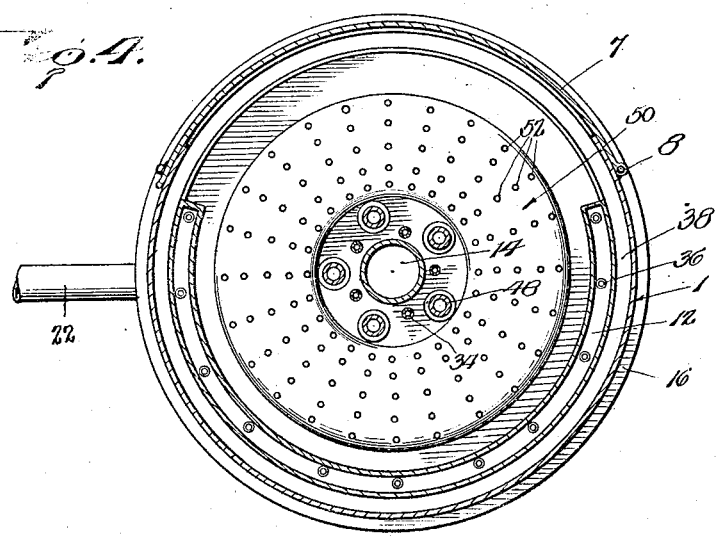
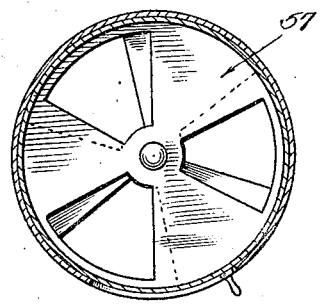
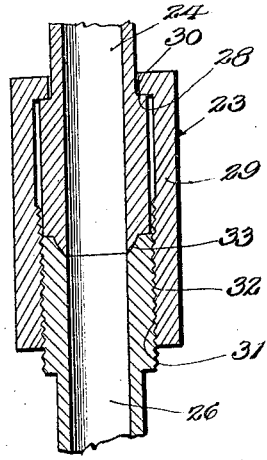
Inventors.
M. L. Risheill,
S. Ames.
By Lacy & Lacy, Attorneys Patented Dec. 23, 1924.

1,520,084

UNITED STATES PATENT OFFICE.

MARCUS L. RISHEILL AND SAMUEL AMES, OF ALEXANDRIA, VIRGINIA; SAID RISHEILL ASSIGNOR TO SAID AMES.

WATER HEATER.

Application filed April 22, 1921. Serial No. 463,602.

*To all whom it may concern:*

Be it known that we, MARCUS L. RISHEILL and SAMUEL AMES, citizens of the United States, residing at Alexandria, in the county of Alexandria and State of Virginia, have invented certain new and useful Improvements in Water Heaters, of which the following is a specification.

This invention relates to water heaters designed especially for domestic and analogous uses and has as one of its objects to provide a heater which will be adapted to deliver a maximum volume of hot water within a minimum period of time of operation.

Another object of the invention is to so construct the heater as to provide for utilization of the maximum number of heat units and thereby render the use of the heater economical, means being provided for causing the hot products of combustion to take a tortuous passage through the heater before being discharged to the outlet flue.

Another object of the invention is to so construct the heater as to present a maximum heating surface to the hot products of combustion and thus obtain the advantages above pointed out.

A further object of the invention is to provide a novel construction and arrangement of burner within a heater of the type mentioned and novel and effective means whereby air may be supplied to the burner in sufficient volume to insure of perfect combustion of the fuel and without subjecting any of the heating surfaces to the cooling influence of the admitted air.

A further object of the invention is to provide a novel coil construction for a water heater of the type mentioned.

In the accompanying drawings:

Figure 4 is a similar view on the line 4—4 of Figure 1;

Figure 5 is a detail horizontal sectional view through one of the air valves;

Figure 6 is a detail vertical sectional view taken substantially on the line 6—6 of Figure 1.

Figure 1:
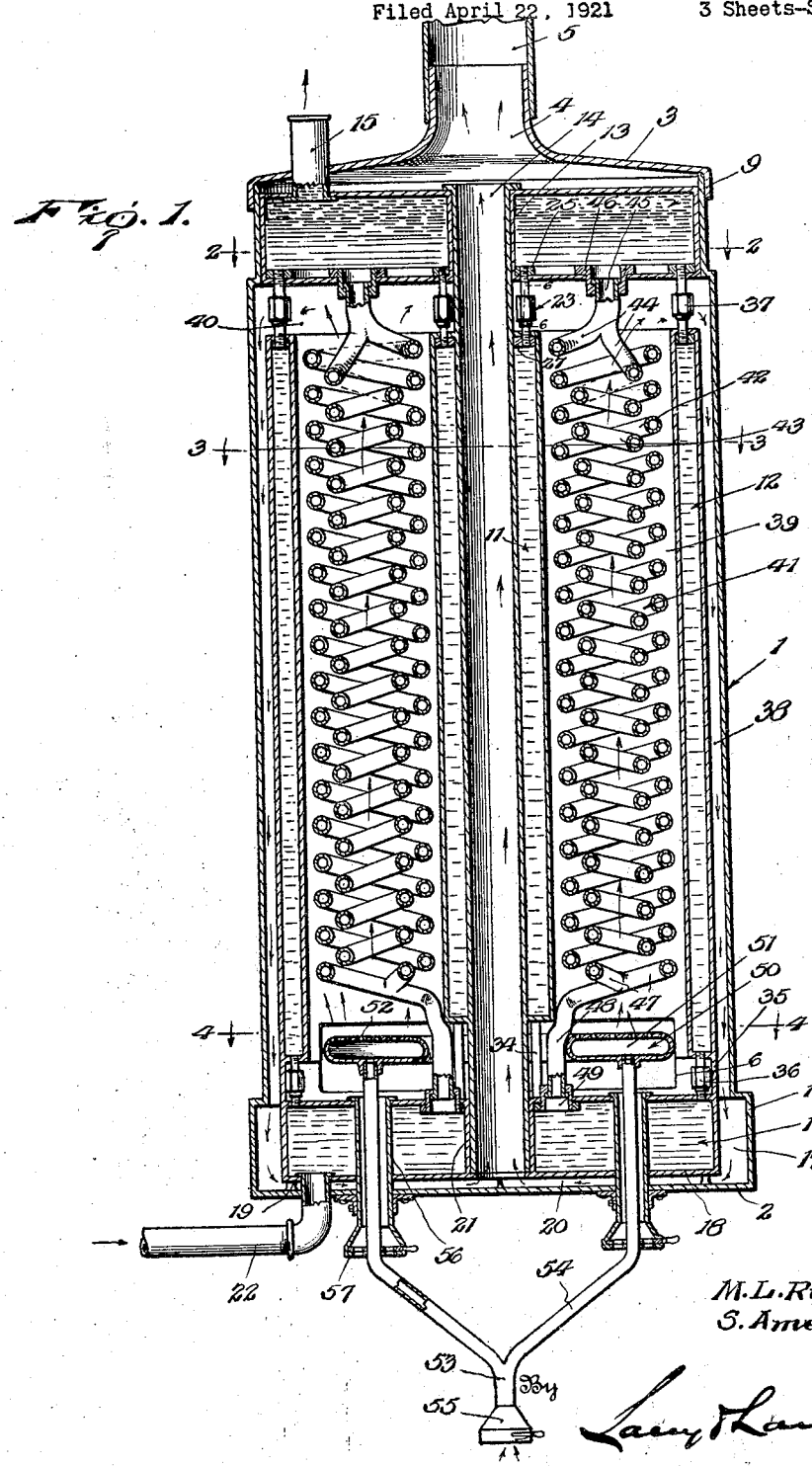
Figure 1 is a vertical diagrammatic sectional view through a water heater constructed in accordance with the present invention.
Figure 2:
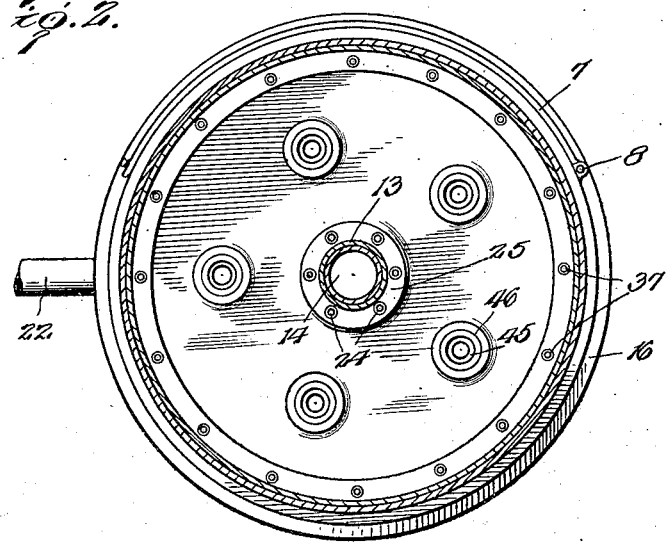
Figure 2 is a horizontal sectional view on the line 2—2 of Figure 1.

The heater comprises an enclosing shell which is indicated in general by the numeral 1 and which is closed at its lower end by a bottom 2 and at its upper end by a dome 3, the latter being provided centrally with an outlet thimble 4 to which may be connected a flue 5 for conducting off the spent products of combustion. An opening 6 may be provided at one side of the shell near the bottom thereof to permit of access to the burner, and a door 7 may be hingedly mounted as at 8 upon the shell in position to normally close this opening.

The heater further comprises upper and lower water heads indicated respectively by the numerals 9 and 10 and concentric inner and outer water chambers respectively indicated by the numerals 11 and 12. The water heads 9 and 10 are of flat cylindrical form and relatively shallow, and the head 9 is arranged within the upper end of the shell 1 and is of a diameter to fill this end of the shell, being provided centrally however with an opening 13 to receive the upper end of a flue pipe 14 which is arranged to discharge through the thimble 4 into the flue 5. The water head 9 is located immediately below but slightly spaced from the dome 3 of the shell 1, and an outlet nipple 15 leads from the top of the water head through the said dome and is adapted for the connection of a pipe (not shown) to carry off the hot water to the point or points where it is required for use.

The lower water head is of substantially the same diameter and depth as the upper water head 9 but does not completely fill the lower end of the shell 1 inasmuch as the shell at this point is increased in diameter, as indicated by the numeral 16. Consequently the walls of the shell and water head are spaced at this point to provide an annular passage 17 for the products of combustion. The bottom 18 of the head 10 is supported in spaced relation to the bottom 2 of the shell 1 as for example by means of lugs 19 upon the said bottom 18, so that an air passage 20 is provided between the bottoms 2 and 18 and communicating with the passage 17. The water head 10 is formed centrally with an opening 21 receiving the lower end of the flue 14, the flue therefore extending practically from the lower to the upper end of the shell 1 and centrally thereof. A water supply pipe 22 is led through the bottom 2 of the shell 1 and into the bottom 18 of the water head 10 from any suitable source of supply and serves to supply cold water to the heater.

As stated the water chambers 11 and 12 are concentrically arranged, and this is true not only with regard to their relation to each other but also to the shell 1 and the central flue 14, the water chamber 11 being either constructed integrally with the flue 14 and surrounding the same or being formed separate therefrom and disposed to surround the flue. Preferably however the structure is an integral one so that the wall of the flue serves as the inner wall of the said chamber. The said chamber 11 extends from a point suitably spaced above the water head 10 to a point suitably spaced below the water head 9 and communication is established between the water head 9 and chamber 11 preferably by a union such as illustrated in Figure 6 of the drawings and indicated in general by the numeral 23. This union comprises a nipple 24 which is threaded into the bottom of the water head 9, the said bottom of the water head being preferably reinforced as at 25 at the point of entrance of the nipple, and a nipple 26 which is threaded in a like manner into the upper end of the water chamber 11 which chamber is likewise reinforced, as at 27. The nipple 24 is provided exteriorly above its lower end with a circumscribing shoulder 28, and a coupling sleeve 29 is rotatably fitted onto the said nipple and is provided at its upper end interiorly with a flange 30 designed to bind against the said shoulder 28. The nipple 26 at its upper end is exteriorly threaded as indicated by the numeral 31, and the coupling sleeve 29 is interiorly threaded at its lower portion, as at 32, so as to have engagement with the nipple 26. Thus when the sleeve 29 is adjusted and tightened, the adjacent ends of the nipples will be drawn together, and inasmuch as they are provided with a ground joint 33, a water-tight union will be effected. The couplings 23 are arranged in an annular series about the portion of the flue 14 which extends between the upper end of the chamber 11 and the bottom of the water head 9. The water chamber 11 is placed in communication at its lower end with the water head 10 by means of pipes 34 threaded at their upper ends into the lower end of the said chamber 11 and at their lower ends into the top of the said head 10 and extending in an annular series about a portion of the flue 14 which extends between the lower end of the water chamber 11 and the top of the water head 10.

Figure 3:
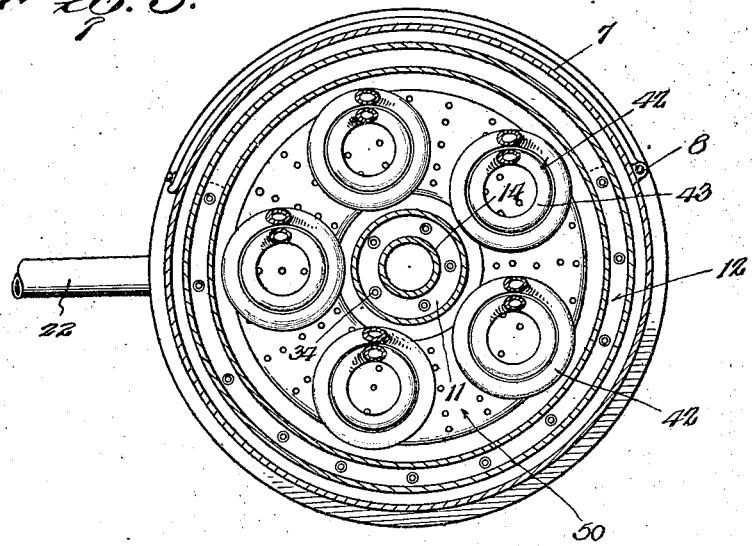
Figure 3 is a similar view on the line 3—3 of Figure 1.

The water chamber 12 may be independent of the water head 10 or it may be connected therewith by an integral connecting wall portion 35 in which and the lower portion of the said chamber 12 the opening 6, heretofore referred to, is formed. In order to establish communication between the bottom of the water chamber 12 and the head 10, pipes 36 are placed in communication at their upper and lower ends respectively with these parts and are arranged in a semi-annular series, as shown in Figure 3. The upper end of the water chamber 12 is placed in communication with the bottom of the water head 9 by couplings 37 identical in construction with the couplings 23 previously described. The said water chamber 12 has a maximum diameter somewhat less than the interior diameter of the shell 1 so that a surrounding air space 38 is provided between the wall of the shell and the outer wall of the said chamber, and the chambers 11 and 12 being spaced and concentrically arranged an intervening air space 39 is provided between them within which space the heating coils are arranged in a manner which will now be described. At this point it may be stated further that the connecting wall portion 35 which extends between the lower end of the water chamber 12 and the top of the water head 10 serves to close communication between the space 38 and the space 39 at the bottom of the heater but these spaces are in communication with each other at the top of the heater by way of a space 40 which is provided between the bottom of the water head 9 and the upper end of the water chamber 12.

Any desired number of heating coils as above referred to may be employed and the said coils are preferably arranged in an annular series as best illustrated in Figure 3 of the drawings and are indicated in general by the numeral 41. The coils are of a double type and each comprises an outer series of convolutions 42 and an inner series of convolutions 43 arranged concentric thereto, the convolutions 42 and 43 merging at their upper ends and being connected by branches 44 by the union of which an outlet nipple 45 is provided. This outlet nipple of each coil set is connected by any suitable union 46 with the bottom of the water head 9 and placed in communication therewith. The coils 42 and 43 are in a like manner connected at their lower ends as at 47 and unite with a water leg 48 which is placed in communication by a suitable coupling 49 with the top of the water head 10, the water legs 48 being arranged in an annular series extending about and relatively close to the portion of the flue 14 which extends between the said water head 10 and the lower end of the water chamber 11.

The burner of the heater is indicated in general by the numeral 50 and the same comprises a relatively flat hollow annular body 51 provided in its top with jet openings 52 for the discharge of the fuel mixture. The burner body is arranged within the space between the lower end of the water chamber 11 and the upper side of the water head 10 and surrounds the adjacent portion of the flue 14, the water legs 48, and the pipes 34. Fuel is supplied to the burner 50 by a pipe 53 which has branches 54 leading in upwardly diverging directions and thence vertically and communicating at their upper ends with the bottom of the burner body 51. A mixing valve 55 of the usual type is provided at the lower or intake end of the pipe 53 so as to provide for admission of a regulated volume of air to mingle with the fuel supplied to the said pipe and thus provide for the propagation of a sootless flame at the burner jets 52. An additional volume of air is required however and this air is preferably supplied through draft pipes 56 which extend through the bottom 2 of the shell 1 and upwardly through the water head 10, the pipes 56 surrounding the vertical portions of the branches 54 of the pipe 53 and being provided at their lower ends and below the bottom 2 of the shell with regulating air inlet valves 57 of a well-known type.

From the foregoing description of the invention it will be understood that the products of combustion will rise from the vicinity of the burner 50 through the space 39, circulating about the coils 41, will enter the space 40, sweeping over the bottom of the water head 9, will pass downwardly through the space 38, sweeping over the outer wall of the water chamber 12, will pass downwardly through the space 17 and about the sides of the water head 10, and will then pass through the space 20, sweeping over the bottom of the said water head 10, and up through the flue 14 in contact with the inner wall of the water chamber 11. The products of combustion, in passing up through the space 39, will of course sweep over the outer wall of the water chamber 11 and the inner wall of the water chamber 12. It will now be evident that the products of combustion are caused, in the operation of the heater, to take a tortuous path through the apparatus so that full benefit is derived from the heat units.

Having thus described the invention, what is claimed as new is:

1. In a water heater, a shell, spaced upper and lower water heads within the shell, a water inlet communicating with the lower head, a water outlet leading from the upper head, a heating coil establishing communication between the heads, the shell having an outlet flue at its top, a second flue within the shell extending through and closed to the space between the water heads and having its upper discharge end opening through the upper head beneath the first-mentioned flue and its lower inlet end opening through the lower head and into the shell, and a burner located within the shell over the lower water head and below the coil, there being a tortuous passage within the shell for the products of combustion from the burner to the inlet end of the second-mentioned flue.

2. In a water heater, a shell, spaced upper and lower water heads within the shell, a water inlet communicating with the lower head, a water outlet leading from the upper head, a heating coil establishing communication between the heads, the shell having an outlet flue at its top, a second flue within the shell extending through and closed to the space between the heads and having its upper discharge end opening through the upper head beneath the first-mentioned flue and its lower intake end opening through the lower head and into the shell, the upper head abutting the wall of the shell to close the upper portion of the shell below the first-mentioned flue, the lower head being spaced from the walls of the shell and from the bottom thereof and surrounding the lower end of the last-mentioned flue, and a burner located within the shell below the coil and over the lower head, the space between the lower head and the bottom of the shell being open to admit to the last-mentioned flue products of combustion passing the lower head.

3. In a water heater, a shell having a closed top provided with a flue opening, a flue extending vertically within the shell and having its upper end arranged to discharge into the said flue opening and its lower end adjacent and spaced from the bottom of the shell, a water head surrounding the upper end of the flue and closing the space between the same and the wall of the shell, a water outlet leading from the said water head, a lower water head within the shell and spaced from the wall and bottom of the same and surrounding the lower end of the flue, a water inlet communicating with the lower water head, a heating coil establishing communication between the water heads, a burner within the shell under the said coil and over the lower water head, the flue at its lower inlet end communicating with the space between the lower water head and the bottom of the shell, and a water chamber surrounding the coil and spaced from the upper water head and the shell and in communication with the lower water head.

4. In a water heater, a shell having a closed top provided with a flue opening, a vertically disposed flue within the shell arranged to discharge at its upper end into the flue opening, a water head surrounding the upper end of the flue, a water outlet leading from the said head, a water head surrounding the lower end of the flue, the upper water head closing the space between the upper end of the flue and the wall of the shell and the lower water head being spaced from the wall and bottom of the shell, a water chamber within the shell in communication with the upper and lower water heads and spaced from the upper water head and from the wall of the shell and the said flue whereby to provide a passage for the products of combustion extending upwardly between the water chamber and the flue and downwardly between the water chamber and the shell and across the bottom of the shell to the lower end of the flue, a heating coil within the space between the flue and the water chamber and communicating with the upper and lower water heads, and a burner within the shell below the coil.

5. In a water heater, a shell having a closed top provided with a flue opening, a vertically disposed flue within the shell arranged to discharge at its upper end into the flue opening, a water head surrounding the upper end of the flue, a water outlet leading from the said head, a water head surrounding the lower end of the flue, the upper water head closing the space between the upper end of the flue and the wall of the shell and the lower water head being spaced from the wall and bottom of the shell, a water chamber within the shell in communication with the upper and lower water heads and spaced from the upper water head and from the wall of the shell and the said flue whereby to provide a passage for the products of combustion extending upwardly between the water chamber and the flue and downwardly between the water chamber and the shell and across the bottom of the shell to the lower end of the flue, a heating coil within the space between the flue and the water chamber and communicating with the upper and lower water heads, and a burner within the shell below the coil, the burner surrounding the said flue above the lower water head.

6. In a water heater, a shell having a closed top provided with a flue opening, a vertically disposed flue within the shell arranged to discharge at its upper end into the flue opening, a water head surrounding the upper end of the flue, a water outlet leading from the said head, a water head surrounding the lower end of the flue, the upper water head closing the space between the upper end of the flue and the wall of the shell and the lower water head being spaced from the wall and bottom of the shell, a water chamber within the shell in communication with the upper and lower water heads and spaced from the upper water head and from the wall of the shell and the said flue whereby to provide a passage for the products of combustion extending upwardly between the water chamber and the flue and downwardly between the water chamber and the shell and across the bottom of the shell to the lower end of the flue, a heating coil within the space between the flue and the water chamber and communicating with the upper and lower water heads, a burner within the shell below the coil, and a second water chamber surrounding the flue and communicating with the upper and lower water heads.

7. In a water heater, a shell having a closed top provided with a flue opening, a flue disposed vertically within the shell and arranged to discharge at its upper end into the flue opening, a water head surrounding the upper end of the flue and closing the space between the same and the wall of the shell, a water outlet leading from the said head, a water head surrounding the lower end of the flue and spaced from the wall and bottom of the shell, a water inlet communicating with the said lower head, a water chamber within the shell surrounding the flue and spaced therefrom and from the wall of the shell and likewise from the upper water head and in communication with the upper and lower heads, means closing the space between the lower end of the chamber and the lower water head whereby products of combustion passing upwardly through the space between the flue and the said chamber will be caused to pass downwardly between the chamber and the wall of the shell and about and beneath the lower water head previous to entering the intake end of the flue, and a burner within the shell above the lower water head.

8. In a water heater, a shell having a closed top provided with a flue opening, a flue disposed vertically within the shell and arranged to discharge at its upper end into the flue opening, a water head surrounding the upper end of the flue and closing the space between the same and the wall of the shell, a water outlet leading from the said head, a water head surrounding the lower end of the flue and spaced from the wall and bottom of the shell, a water inlet communicating with the said lower head, a water chamber within the shell surrounding the flue and spaced therefrom and from the wall of the shell and likewise from the upper water head and in communication with the upper and lower heads, means closing the space between the lower end of the chamber and the lower water head whereby products of combustion passing upwardly through the space between the flue and the said chamber will be caused to pass downwardly between the chamber and the wall of the shell and about and beneath the lower water head previous to entering the intake end of the flue, a heating coil establishing communication between the water heads and located within the space between the flue and the water chamber, and a burner located within the shell below the coil.

9. In a water heater, a shell having a closed top provided with a flue opening, a flue disposed vertically within the shell and arranged to discharge at its upper end into the flue opening, a water head surrounding the upper end of the flue and closing the space between the same and the wall of the shell, a water outlet leading from the said head, a water head surrounding the lower end of the flue and spaced from the wall and bottom of the shell, a water inlet communicating with the said lower head, a water chamber within the shell surrounding the flue, and spaced therefrom and from the wall of the shell and likewise from the upper water head and in communication with the upper and lower heads, means closing the space between the lower end of the chamber and the lower water head whereby products of combustion passing upwardly through the space between the flue and the said chamber will be caused to pass downwardly between the chamber and the wall of the shell and about and beneath the lower head previous to entering the intake end of the flue, a heating coil establishing communication between the water heads and located within the space between the flue and the water chamber, a burner located within the shell below the coil, and a water chamber surrounding the flue and having a wall in common therewith, the last-mentioned water chamber being in communication with the said upper and lower water heads.

10. In a water heater, a shell having a closed top provided with a flue opening, a flue disposed vertically within the shell with its upper end in position to discharge into the said flue opening and its lower end spaced above the bottom of the shell, a water head surrounding the upper end of the flue and closing the space between the same and the wall of the shell, a water outlet leading from the said head, a lower water head surrounding the lower end of the flue and spaced from the wall and bottom of the shell, a water inlet communicating with the lower water head, a water chamber surrounding the flue and spaced therefrom and from the wall of the shell and at its upper end spaced from the upper water head, means closing the space between the lower end of the chamber and lower water head, a series of heating coils arranged within the space between the said flue and the water chamber and communicating with the upper and lower water heads, and a burner within the shell above the lower water head and between the said flue and the said water chamber.

11. In a water heater, a shell having a closed top provided with a flue opening, a flue disposed vertically within the shell with its upper end in position to discharge into the said flue opening and its lower end spaced above the bottom of the shell, a water head surrounding the upper end of the flue and closing the space between the same and the wall of the shell, a water outlet leading from the said head, a lower water head surrounding the lower end of the flue and spaced from the wall and bottom of the shell, a water inlet communicating with the lower water head, a water chamber surrounding the flue and spaced therefrom and from the wall of the shell and at its upper end spaced from the upper water head, means closing the space between the lower end of the chamber and lower water head, a series of heating coils arranged within the space between the said flue and the water chamber and communicating with the upper and lower water heads, a burner within the shell above the lower water head and between the said fuel and the said water chamber, the water chamber surrounding the said flue and having a wall in common therewith, the last mentioned water chamber being in communication with the upper and lower water heads.

In testimony whereof we affix our signatures.

MARCUS L. RISHEILL. [L. S.]
SAMUEL AMES. [L. S.]